US 9,213,744 B2

(12) United States Patent
Irwin (10) Patent No.: US 9,213,744 B2
(45) Date of Patent: Dec. 15, 2015

(54) PERTURBING SEARCH RESULTS

(71) Applicant: John Irwin, San Francisco, CA (US)

(72) Inventor: John Irwin, San Francisco, CA (US)

(73) Assignee: IFWE INC., San Francisco, CA (US)

( * ) Notice: Subject to any disclaimer, the term of this patent is extended or adjusted under 35 U.S.C. 154(b) by 202 days.

(21) Appl. No.: 13/840,031

(22) Filed: Mar. 15, 2013

(65) Prior Publication Data

US 2014/0280059 A1    Sep. 18, 2014

(51) Int. Cl.
*G06F 17/30* (2006.01)

(52) U.S. Cl.
CPC ...... *G06F 17/30522* (2013.01); *G06F 17/3053* (2013.01)

(58) Field of Classification Search
CPC .................................................. G06F 17/3053
USPC .......................... 707/723, 732, 748
See application file for complete search history.

(56) References Cited

U.S. PATENT DOCUMENTS

| 7,769,740 | B2 * | 8/2010 | Martinez et al. ............. 707/706 |
| 8,706,725 | B2 * | 4/2014 | Bailey et al. ................. 707/733 |
| 8,799,276 | B1 * | 8/2014 | Hyatt et al. ................... 707/723 |
| 2006/0059147 | A1 | 3/2006 | Weiss et al. |
| 2007/0214131 | A1 * | 9/2007 | Cucerzan et al. ................ 707/5 |
| 2008/0027921 | A1 * | 1/2008 | Chandrasekar et al. .......... 707/4 |
| 2009/0234828 | A1 | 9/2009 | Tu |
| 2009/0282144 | A1 * | 11/2009 | Sherrets et al. ............. 709/224 |
| 2009/0307196 | A1 * | 12/2009 | Shuster ............................. 707/3 |
| 2010/0010987 | A1 * | 1/2010 | Smyth et al. ..................... 707/5 |
| 2010/0094869 | A1 | 4/2010 | Ebanks |
| 2011/0066954 | A1 | 3/2011 | Zuber |
| 2011/0208730 | A1 * | 8/2011 | Jiang et al. .................... 707/727 |
| 2011/0246456 | A1 * | 10/2011 | Weitz et al. ................... 707/724 |
| 2011/0320441 | A1 * | 12/2011 | Lee et al. ...................... 707/723 |
| 2012/0310929 | A1 * | 12/2012 | Patterson et al. ............. 707/728 |
| 2013/0185325 | A1 * | 7/2013 | Schmidt ....................... 707/769 |
| 2013/0246412 | A1 * | 9/2013 | Shokouhi et al. ............. 707/730 |
| 2013/0262230 | A1 * | 10/2013 | King et al. ................. 705/14.54 |
| 2013/0311455 | A1 * | 11/2013 | Kritt et al. .................... 707/723 |
| 2014/0095412 | A1 * | 4/2014 | Agashe et al. .................. 706/12 |
| 2014/0129942 | A1 * | 5/2014 | Rathod ......................... 715/720 |
| 2014/0172565 | A1 * | 6/2014 | Alon et al. ................. 705/14.54 |

OTHER PUBLICATIONS

International Search Report and Written Opinion mailed Aug. 14, 2014, for International Patent Application No. PCT/US2014/029012, pp. 1-7.

\* cited by examiner

*Primary Examiner* — Cam-Linh Nguyen
(74) *Attorney, Agent, or Firm* — Perkins Coie LLP (57) ABSTRACT

Disclosed here are methods, systems, paradigms and structures for spreading the interest of a user evenly over a predefined set of search results. A search engine retrieves search results from a database and perturbs at least a portion of the search results, that is, randomizes the order of the portion before presenting it to the user. In this way, even when a search is repeated between database update cycles, the user would see different top search results every time the search is executed. The perturbation technique can be applied to a search in a social networking system which searches for users. The perturbation can be done by randomizing the display order of the sear results based on a most recent activity time of the user. The perturbed search results will have different users every time the user performs a search. The perturbed search results are customized per user.

21 Claims, 7 Drawing Sheets

PERTURBING SEARCH RESULTS

FIELD OF INVENTION

This invention relates to searching techniques in computer software applications and more specifically to perturbing search results in a social network.

BACKGROUND

Social networks in online environments are increasingly relied upon by individuals to engage and participate in various types of social activities and behaviors. Individuals use online social networks to facilitate friendly, casual, romantic, business relationships and to maintain connections and initiate dialogues with others. With the prevalence of high speed network connections to the Internet and the availability of mobile devices with wireless capabilities, the online environment has become one of the dominating mechanisms through which people communicate and connect with one another.

Social networks typically allow users to search for other users for, for example, connecting with them or buying them in a game. In current searching techniques of such social networks, when two users perform a search with similar search parameters, the search result provided to them can be the same. Unfortunately, this can be a problem when both the users click to purchase the same user at the same time.

The amount of data managed in a social network is significantly huge, especially, if the number of users are in the order of hundreds of millions. In order to minimize the consumption of resources, the current social networking systems typically update the database with any new information or changes to existing information once every few minutes. Since the database is updated once every few minutes, when a user performs a search between database updates, the search result can be the same as the previous search result. That is, the search result may not obtain any new users.

Further, since the search results are spread over a number of pages, the users that are not among the users shown in the first page of the results may not be viewed by the searcher. Typically, the searcher may not navigate at all, or may not navigate to more than two or three pages. Unfortunately, such search results do not spread the interest of the searcher evenly over the search results.

SUMMARY

Introduced here are methods, systems, paradigms and structures for spreading the interest of a user evenly over a predefined set of search results. In one implementation of a search, a search engine retrieves search results from a cache/database and perturbs at least a portion of the search results before presenting the search results to the user. That is, the search engine randomizes the order of the portion of the search results. In this way, even when a search is repeated between database update cycles, the user would see different top search results every time the search is executed. Further, the search results may be perturbed every time the results are presented.

In one embodiment, the perturbation technique can be applied to a social networking system. Consider a scenario, for example, in a game the social networking system where users "buy" other users as "pets," a user of the social networking system is searching for other users. The search may retrieve 1000 users and display top 50 users. Further, consider that the search results are sorted based on some criterion and are displayed as a multiple page list and each page displays 10 search results. In order to spread the interest of the user evenly among the top 50 users, the top 50 search results may be perturbed before presenting it to the user. Accordingly, the first page (and the next four pages) will have different users (among the top 50 users) every time the user performs a search, regardless of whether the search is executed between database update cycles.

Further, in at least some embodiments, the perturbation can be performed specific to users. That is, the search results presented to two different users performing the same search, regardless whether the search is performed by the users at the same time, will be different.

The perturbation can be done based on various criteria. In at least some embodiments, the perturbation is done based on time. In the above social networking example, the search results may be perturbed based on a most recent activity time of the user. For example, consider that search results are sorted based on the most recent activity time of each of the users. The top 50 results may be perturbed by modifying the most recent activity time of the users by a predefined amount of time based on a random function. For example, the most recent activity time of the top 50 users may be modified by adding, subtracting, or as a function of a predefined amount of time, say 4 minutes. The perturbed search results may then be sorted by the most recent activity time and presented to the users. Accordingly, the top 10 users can be different (but are still within the top 50 users initially retrieved) each time the search is executed. Further, different perturbation criterion can be used for different users.

Embodiments of the disclosed technique can display different search results for an identical query by different users. Embodiments of the disclosed techniques can perturb the search results per user and/or even per search. Further, the unperturbed search results and the per user/search perturbed search results can be stored in a cache.

Some embodiments of the disclosed technique have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed here are methods, systems, paradigms and structures for spreading the interest of a user evenly over a predefined set of search results. In one implementation of a search, a search engine retrieves search results from a cache/database and perturbs at least a portion of the search results before presenting the search results to the user. That is, the search engine randomizes the order of the portion of the search results. In this way, even when a search is repeated between database update cycles, the user would see different top search results every time the search is executed. Also, even when two different users perform the same search, the search results presented to them will be different. This can solve a problem where two different users attempt to access the same user at the same time, for example, in the game of "pets" where both the users can click on the same user at the same time. Further, the search results may be perturbed every time the results are presented.

In one embodiment, the perturbation technique can be applied to a social networking system. Consider a scenario, for example, in a game the social networking system where users "buy" other users as "pets," a user of the social networking system is searching for other users. The search may retrieve 1000 users and display top 50 users. Further, consider that the search results are sorted based on some criterion and are displayed as a multiple page list and each page displays 10 search results. In order to spread the interest of the user evenly among the top 50 users, the top 50 search results may be perturbed before presenting it to the user. Accordingly, the first page (and the next four pages) will have different users (among the top 50 users) every time the user performs a search, regardless of whether the search is executed between database update cycles.

Further, in at least some embodiments, the perturbation can be performed specific to users. That is, the search results presented to two different users performing the same search, regardless whether the search is performed by the users at the same time, will be different.

The perturbation can be done based on various criteria. In at least some embodiments, the perturbation is done based on time. In the above social networking example, the search results may be perturbed based on a most recent activity time of the user. For example, consider that search results are sorted based on the most recent activity time of each of the users. The top 50 results may be perturbed by modifying the most recent activity time of the users by a predefined amount of time based on a random function. For example, the most recent activity time of the top 50 users may be modified by adding, subtracting, or as a function of a predefined amount of time, say 4 minutes. The perturbed search results may then be sorted by the most recent activity time and presented to the users. Accordingly, the top 10 users can be different (but are still within the top 50 users initially retrieved) each time the search is executed.

Embodiments of the disclosed technique can display different search results for an identical query by different users. Embodiments of the disclosed techniques can perturb the search results per user and/or even per search. Further, the unperturbed search results and the per user/search perturbed search results can be stored in a cache.

Figure 1:
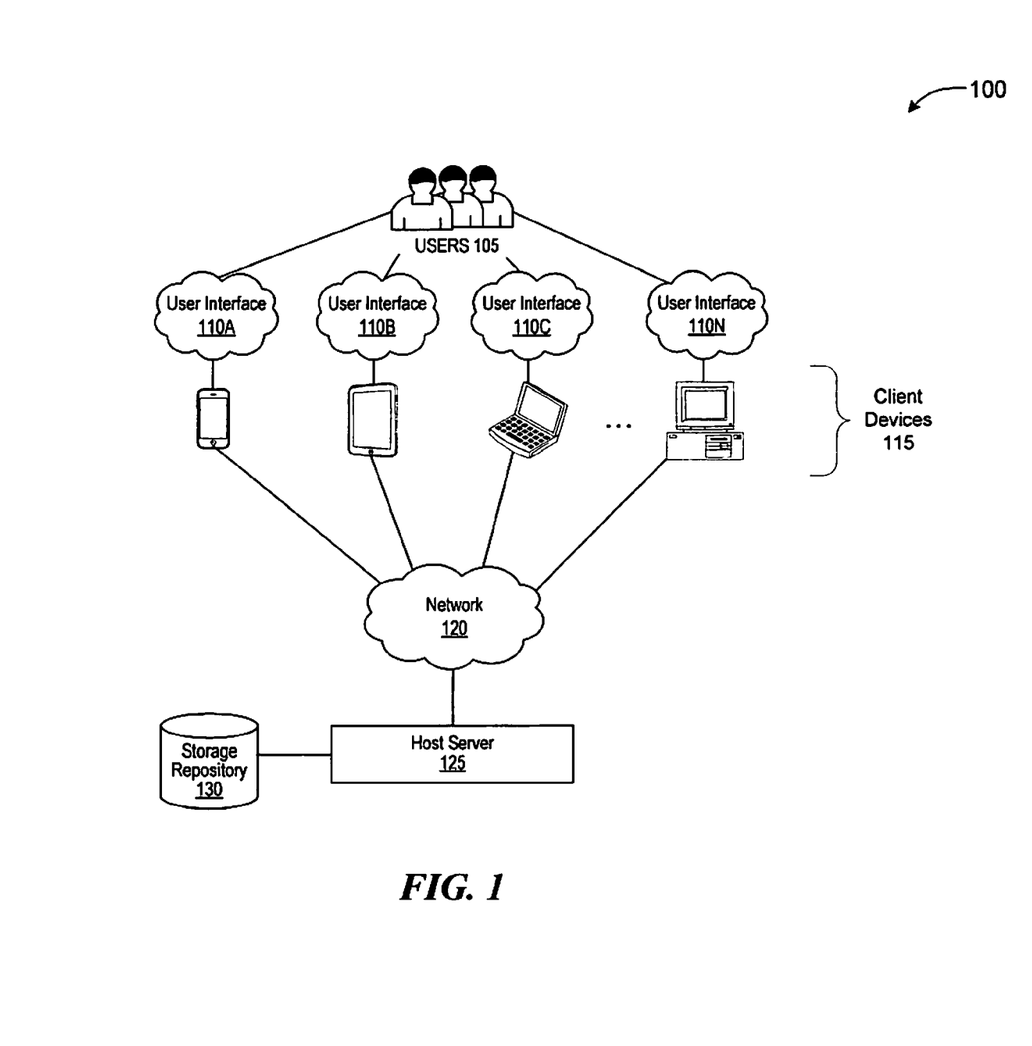
FIG. 1 is an environment in which an embodiment of the disclosed technique may operate.

FIG. 1 illustrates a social networking environment 100, according to an embodiment of the disclosed technique. A set of users 105 access the host server 125 of the social networking environment 100 using plurality of client devices 115. Among other activities, the users 105 may search for other users in the social networking environment 100 to connect with them or play games with them. In one example, users 105 may search for other users and "buy" one or more of the users they are interested in, in a game in the social networking environment.

The client devices 115 or user devices 115 can be any system and/or device, and/or any combination of devices/systems that is able to establish a connection with another device, a server and/or other systems. The client devices 115 typically include display or other output functionalities to present data exchanged between the devices to a user. For example, the client devices can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices 115 are coupled to a communication network 120. In some embodiments, the client devices 115 may be directly connected to one another.

The communication network 120, over which client devices 115 and the host server 125 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc. The network 120 can be any collection of distinct networks operating wholly or partially in conjunction to provide connectivity to the client devices 115 and host server 125 and may appear as one or more networks to the serviced systems and devices. In one embodiment, communications to and from client devices 115 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The storage repository 130 can be a database, and can store content (e.g., news stories), software, user profile, descriptive data, images, system information, drivers, and/or any other data item or file utilized by other components of the host server 125 and/or any other servers for operation. The storage repository 130 can also include a search engine, a search database or a search index. The storage repository 130 may be coupled to the host server 125. The storage repository 130 may be managed by a database management system (DBMS), for example but not limited to, Oracle, DB2, Microsoft Access, Microsoft SQL Server, PostgreSQL, MySQL, FileMaker, etc. The storage repository 130 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 125 is able to provide data to be stored in the storage repository 130 and/or can retrieve data stored in the storage repository 130. The storage repository 130 can store user data and/or content information (including user content information) such as, for example, user posts, comments, etc. The storage repository 130 is shown as a discrete component in the example of FIG. 1; however, in some embodiments, the user storage repository 130 may be included in the host server 125. Additionally, in some embodiments, the storage repository 130 and/or the host server 125 may be both physically and/or functionally distributed.

The storage repository 130 can also store dynamic user data. Dynamic user data can either be explicitly submitted by the user or provided via one or more software agents and/or hardware modules such as the host server 125 coupled to the storage repository 130. Dynamic user data can be any action or communication initiated by a user of the social network. For example, a user can periodically update his/her user profile which can be stored in the storage repository 130. Similarly, user preferences can be automatically identified and stored in the repository.

In some embodiments, dynamic information or activities such as user interactions (social interactions), relationships with other users, user connections, social records, social history records, and/or any communication records can be recorded and stored in the storage repository 130. In this manner, the dynamic user data essentially tracks the electronic actions that a user performs within the social networking environment. Examples of dynamic information include, but are not limited to, indications that a user would like to meet another user, indications that a user liked something, indications that a virtual gift was sent or received, indications that a wink was sent or received, indications that a user bought another user in a game and/or indications that a user tagged another user or was tagged by another user. Any electronic action that a user can take within the social network comprises dynamic user data.

In one embodiment, the host server 125 is configured to facilitate social exploration in the web-based social networking environment 100. The host server 125 facilitates searching for users and displaying the search results to the users 105 via one or more of user interface 110A-N. In an embodiment, each of the client device 115 can have a corresponding user interface 110A-N.

Figure 2:
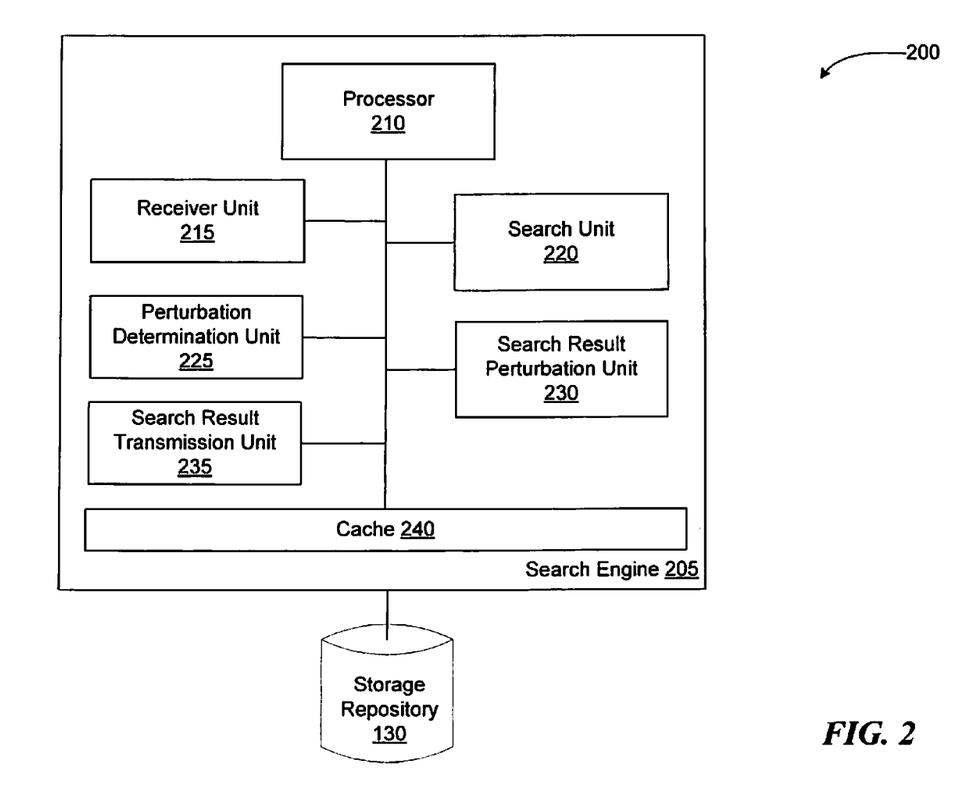
FIG. 2 is a block diagram illustrating an architecture of a search engine for perturbing search results.

FIG. 2 illustrates an example architecture 200 of a search engine that can be operated in the social networking environment 100 to perturb search results, in accordance with an embodiment of the disclosed technique. The search engine 205 facilitates searching for information based on a particular search query. In one example, the search engine 205 can be used in the social networking environment 100 to facilitate searching for users of the social networking environment 100. In an embodiment, the search engine 205 can be installed as a software on the host server 125 or can be coupled to the host server 125 as a separate module. A user may search for other users in the social networking environment 100 for various purposes, including connecting with the new users, chatting with users, meeting new users, playing games such as "pets" where a user "buys" another user as a "pet."

The search engine 205 includes a processor 210 that coordinates with various other components to execute the instructions to perform the search. A receiver unit 215 receives a search query from a user such as one of the users 105. The search query can include various parameters or filters for finding the users. For example, the search query can specify one or more of a country, ethnicity, sex, or age as a search filter. In a game such as "pets," the search parameters can also include a "value" of a user—typically, a dollar value a "pet" is associated with.

The search unit 220 executes the search query and obtains the search results from a cache 240 or from the storage repository 130 if the search results are not available in the cache 240. The search results includes a list of users matching the search parameters. The search results are then presented to the user. Further, the search results may be sorted based on a particular criterion before being presented to the user. Examples of various criteria for sorting can include country, proximity of the user's location to the searcher's location, value of the user, age, alphabetical order, goodness level of the user, most recent activity time of the user (aka "last active time"), etc. In an embodiment, the goodness level of the user may be an indication of a degree of match between the user and one or more of the search parameters. In other embodiments, the goodness level may be calculated based on various other parameters and using other logic. Further, the search results may be sorted in multiple levels. For example, the search results may be sorted by goodness level of the users, and within each goodness level, the users may be sorted by most recent activity time.

Updating a database can be resource intensive, especially if a social networking environment such as social networking environment 100 has hundreds of millions of users. Accordingly, in certain embodiments, the storage repository 130 may be updated only at particular intervals of time to minimize consumption of computing resources. For example, the storage repository 130 may be updated every 5 minutes. So, when a user repeats the search within those 5 minutes, the search results presented to the user can be the same as the previous one. That is, the user may see the same users in the search results until the storage repository 130 is updated.

Further, when the search results are presented to the user via a search result screen, typically, the results are split into a number of pages and each page displays a certain number of the search results. The user would have to navigate to different pages of the search result to view all the search results. Generally, the user may not go beyond two or three pages. Accordingly, the users listed in pages four onwards may not get the interest of the user performing the search.

In order to spread the interest of the user to a particular set of users evenly, in an embodiment, the search results, or at least a portion of the search results such as a top few search results, obtained from the storage repository 130 or the cache 240 may be perturbed before displaying them to the user. That is, the order of the search results may be randomized when the search results are presented to the user. Such perturbation technique avoids presenting the same search results in the top few pages of the search result screen when the search is repeated. The end user may see different users in the top search results every time the search is repeated. Also, even when two different users perform the same search, the search results presented to them will be different. This can solve the problem where two different users attempt to access the same user at the same time, for example, in the game of "pets" where both the users can click on the same user at the same time.

The search results can be perturbed based on various criteria. A perturbation determination unit 225 determines the criteria for perturbation. Examples of criteria include time, a rank or score of search results, etc. The perturbation determination unit 225 also determines other factors such as perturbation amount, for example, an amount of time or scored by which the results are perturbed, whether to perturb the search results, etc. In an embodiment, the social networking environment 100 provides a user interface (not shown), where an administrator can configure the perturbation determination unit 225 by providing the above details. In one example, the administrator may configure the perturbation determination unit not to perturb the search results when a particular query is executed by the user for the first time or first time after a database is updated, etc.

A search result perturbation unit 230 perturbs the search results obtained by the search unit 220 (also referred to as "intermediate search results") before presenting it to the user. The search result perturbation unit 230 can perturb the search result order based on a criterion determined by the perturbation determination unit 225. In one example, the perturbation criterion includes time.

In an embodiment, the search result perturbation unit 230 perturbs the intermediate search results based on a most recent activity time or a last active time of the users. The most recent activity time or the last active time can include the time when the user performed the last activity in the social networking environment 100. The activity can include a variety of tasks such browsing the social networking environment, playing a game, chatting with another user, posting a comment, or any other activity that commands a user's attention. The search result perturbation unit 230 sorts the intermediate search results by the most recent activity time, the user having the most recent activity time being at the top of the result set, and perturbs the order of the intermediate search results by modifying the most recent activity time of the users by a random amount of time. The most recent activity time of each of the users in the intermediate results can be changed based on a random function of predefined amount of time. The perturbed search results are then sorted by the modified most recent activity time and presented to the user via a search result transmission unit 235.

As described above, the predefined time period for perturbing a set of search results may be a configurable value. For example, if a set of users who are 5 minutes apart have to be perturbed, then the amount of time used to modify the most recent activity time of each of the users in the intermediate results can be a random value between 0 and 5 minutes. Further, the random function ensures that the set of users who are 5 minutes apart in the intermediate search results are still 5 minutes apart in the perturbed search results. That is, if a first user in the intermediate search result, user A, was active a minute ago and the last user, user B was active 6 minutes ago, in the perturbed search results, user B's last login-time cannot be more than 5 minutes apart from whoever a first user in the perturbed search result is.

The predefined time period may be revised (increased or decreased) based on the prior user selections of the search results. For example, if the users/searchers often select users who were farthest from the most recently logged in user, the predefined time period may be increased accordingly to consider more users. In an embodiment, the amount of time by which the most recent activity time of the users are modified (for perturbing the search results) can be a value in the range of zero to the predefined time period, that is, it is a function of the predefined time period. For example, if the search result perturbation unit 230 considers users who are within 5 minutes apart from the most recently logged in user, then the random amount of time used to modify the last login time will be 0 to 5 minutes.

Further, when the user repeats the search query between database update cycles, different search results are presented to the user since the search results are perturbed randomly every time. Also, since the database is not updated yet, the intermediate search results from which the portion of search results are perturbed is still the same. That is, a user can see different search results each time the same search query is executed. Also, different users issuing an identical search query can see different search results because of the random perturbation. Since, for a given search query, the search results can be different for different instances of search and for different users, the per search, the per user perturbed search results can be stored in the cache 240.

In order to achieve user specific the perturbation, in at least some embodiments, different perturbation criteria can be used for different users. One possible method of having a specific perturbation criterion for a specific user can be achieved by using a user identification (ID) of the user to arrive at the user specific perturbation criterion. That is, the search results presented to two different users performing the same search, regardless whether the search is performed by the users at the same time, will be different, but also consistent for a specific user.

In at least some embodiments, in order to keep less relevant search results or "bad" results from appearing at the top of search results due to perturbation, the search result perturbation unit 230 ensures only a portion of the intermediate search results that are relevant are perturbed. In one embodiment, this can be done by selecting a predefined time period (from the most recently logged in user) appropriately. The relevancy of search results to the search query can be a function of predefined time period. Higher the time period between a particular user and most recently logged in user (which is also the top most result in the intermediate search results), lower is the relevancy of the particular user to the search query. For example, a set of users who are within 5 minutes from the most recently logged in user are more relevant to the search query than the set of users who are within 10 minutes from the most recently logged in user.

In one embodiment, the administrator may set a relevancy threshold for perturbation. Only the search results that meet or exceed the relevancy threshold can be considered for perturbation. The time period may be derived as a function of this relevancy threshold. Accordingly, by choosing an appropriate predefined time period the perturbation technique ensures that less relevant search results are kept from being perturbed.

After the selected portion of intermediate search results are perturbed, the search result perturbation unit 230 appends the portion of the intermediate search results that are not perturbed to the perturbed search results and presents to the user via the search result transmission unit 235.

In at least some embodiments, the perturbation technique can be performed in a distributed manner. For example, the intermediate search results can be downloaded to a local device such as one of the client devices 115 and the perturbation of the intermediate search results can be performed at the local device. In such embodiments, the search engine 205 can be distributed in the social networking environment 100. For example, the search result perturbation unit 230 can be installed in the client devices 115. If the search result perturbation unit 230 is implemented, at least in part, as software, then the search result perturbation unit 230 can be downloaded to the client devices 115 from the host server 125 as a plug-in, script, or can be installed on the client devices 115 directly.

Figure 3:
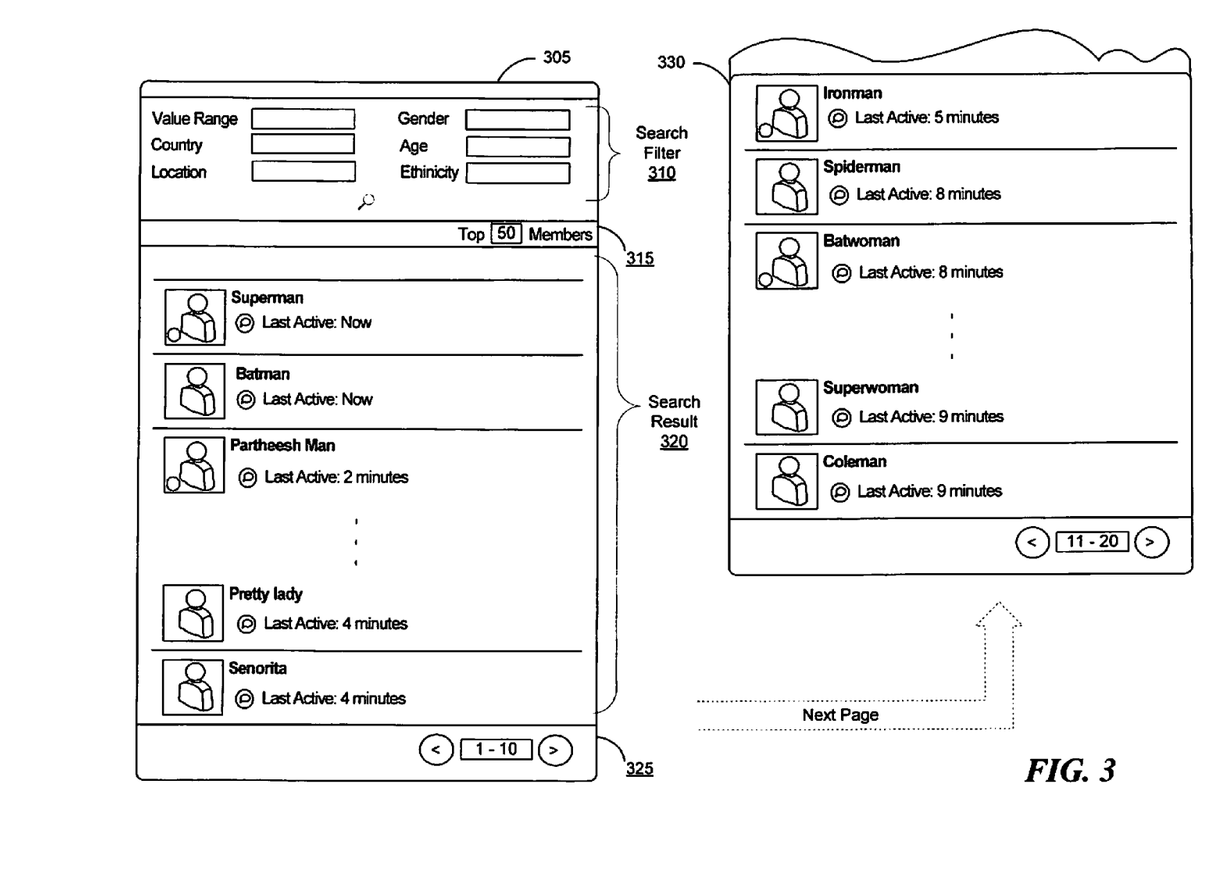
FIG. 3 illustrates an example screen showing search results in the social networking environment of FIG. 1.

FIG. 3 illustrates an example screen showing search results in the social networking environment of FIG. 1, in accordance with one embodiment of the disclosed technique. The screen 305 shows a search user interface used for searching users in a social networking environment such as social networking environment 100. Further, the search results 320 shown in the screen 305 and portion of screen 330 are non-perturbed search results. However, the same screens can be used to display perturbed search results such as perturbed search results 415 of FIG. 4.

A user can create a search query by specifying search parameters in the search filter 310. The user may provide a result set size 315 which indicates the number of search results the user prefers to see. The search results 320 may be sorted by most recent activity time or the last active time as shown in screen 305 and portion of screen 330. Further, the search user interface shows a predefined number of search results in each page. For example, the search user interface may show 10 search results per page as shown in screen 305 and portion of screen 330. The user may use navigation buttons 325 to navigate between various pages of the search results 320. For example, the user may navigate to portion of screen 330 showing the next 10 result using the navigation buttons 325.

In an embodiment, the search results 320 can be of varied goodness levels. The search results 320 can be presented in decreasing order of goodness levels. For example, if the result set size 315 is 100, the top 30 search results may be of the highest goodness level, the next 50 may be of goodness level lower than the top 30, and the bottom 20 results may have the least goodness level. Further, the results within each goodness levels may be sorted based on the most recent activity time.

Figure 4:
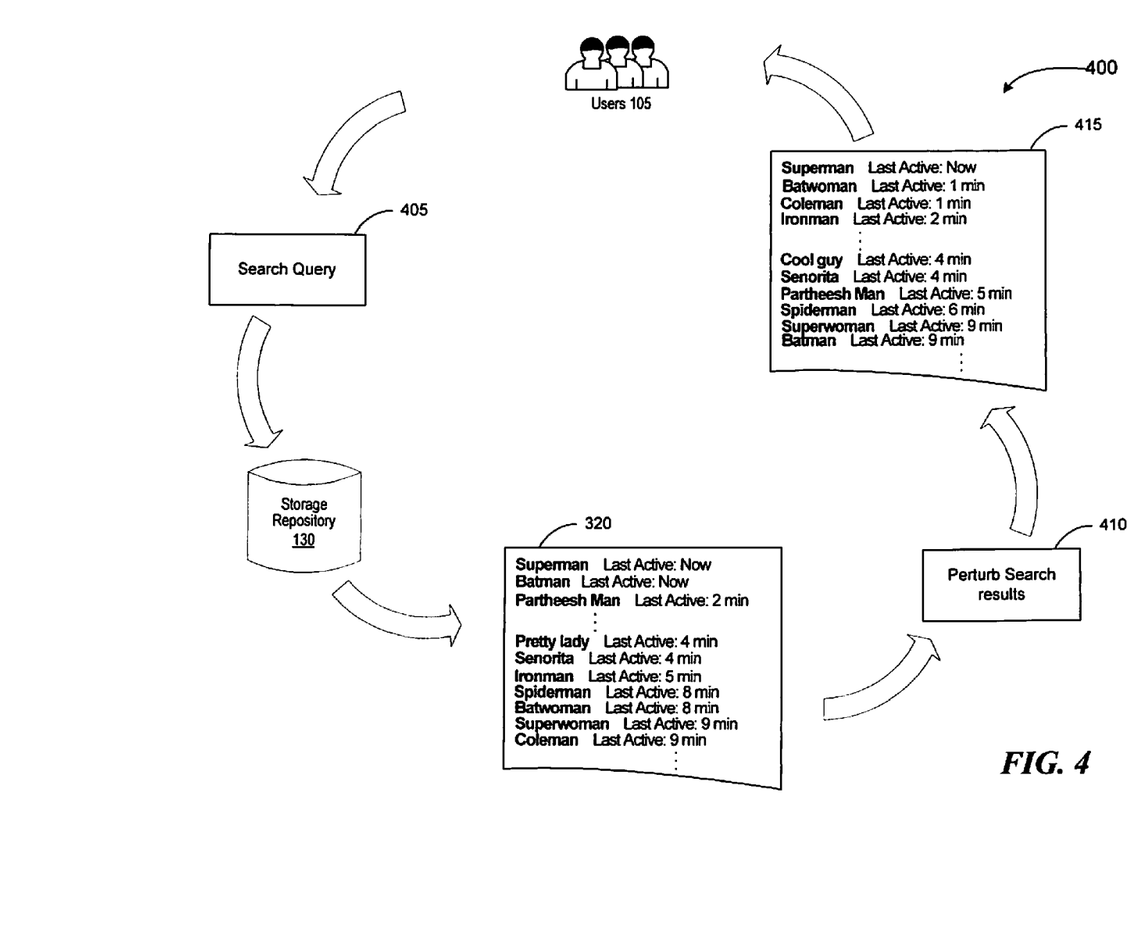
FIG. 4 illustrates an example of perturbing search results displayed in the screen of FIG. 3.

FIG. 4 illustrates an example 400 of perturbing search results displayed in the screen 305 and 330 of FIG. 3, in accordance with one embodiment of the disclosed technique. The methods of example 400 may be executed in an environment such as social networking environment 100 of FIG. 1 and/or a search engine 205 of FIG. 2. One or more of users 105 issues a search query 405 including a search filter. The search query 405 is executed and the intermediate search results such as search results 320 are obtained from the storage repository 130.

The intermediate search results 320 are sorted by most recent activity time of the users. At 410, the intermediate search results 320 are perturbed based on most recent activity time (or last active time) and the resulting perturbed search results 415 are sorted by the modified most recent activity time before being presented to the users 105.

In the example 400, top intermediate search results that are 9 minutes apart are perturbed. In other embodiments, other predefined periods or predefined number of users may be considered. Further, as described earlier, the intermediate search results 320 are perturbed such that the modified most recent activity time of any of the users in the perturbed search results 415 is still within 9 minutes from the top most perturbed search result. Also, it can be noted that since the most recent activity time is modified as a random function of a predefined amount of time (9 minutes in this example), there are chances, though rare, that the random function may evaluate to zero in some cases, and therefore, the resulting most recent activity time for a particular can remain unchanged from the most recent activity time in the intermediate search results 320. For example, the most recent activity time of "Superman" is unchanged in the perturbed search results set 415.

When a user of the users 105 who executed the search query 405 repeats the search query 405, the perturbed search results presented to the user can be different from perturbed search results 415 since the perturbation is done on a random basis. While the intermediate search results 320 can be the same (if the database is not updated yet), the perturbed search results can have the users in a different order from the perturbed search results 415. Further, even when another user of users 105 executes the search query 405, the perturbed search results presented to the other user can have the users in a different order from that of the perturbed search results 415.

Figure 5:
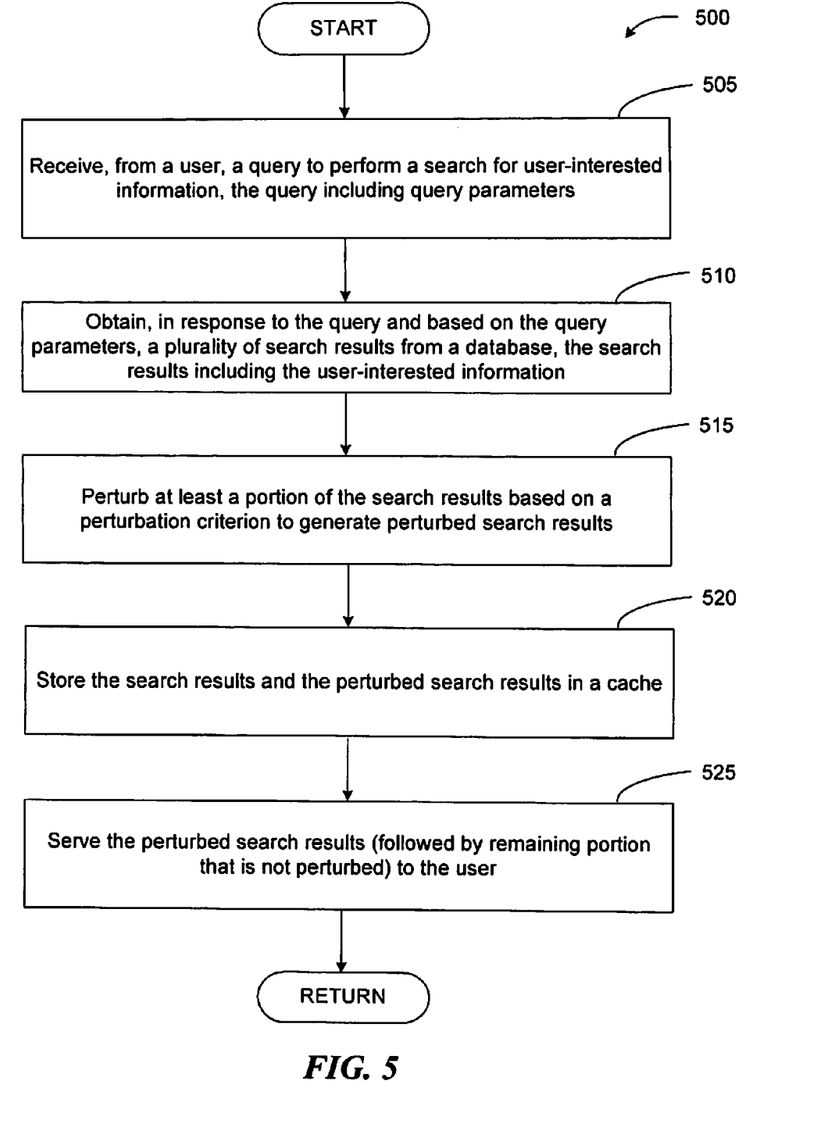
FIG. 5 illustrates a flow diagram of a process for perturbing search results.

FIG. 5 illustrates a flow diagram a process 500 for perturbing search results, in accordance with one embodiment of the disclosed technique. The process 500 may be executed in an environment such as social networking environment 100 of FIG. 1 and/or a search engine 205 of FIG. 2. At step 505, the receiver unit 215 receives a search query including query parameters from a user. At step 510, the search unit 220 executes the search query and obtains a plurality of search results (also referred to as intermediate search results) from a cache such as cache 240 or a database such as storage repository 130.

At step 515, the search result perturbation unit 230 perturbs at least a portion of the intermediate search results based on a perturbation criterion to generate the perturbed search results. At step 520, the search result perturbation unit 230 stores the intermediate search results and the perturbed search results in the cache. At step 525, the perturbed search results followed by any unperturbed intermediate search results are presented to the user.

Further, the search results can be perturbed specific to a user. In order to achieve user specific the perturbation, in at least some embodiments, different perturbation criteria can be used for different users. One possible method of having a specific perturbation criterion for a specific user can be achieved by using a user identification (ID) of the user to arrive at the user specific perturbation criterion. That is, the search results presented to two different users performing the same search, regardless whether the search is performed by the users at the same time, will be different, but also consistent for a specific user.

Figure 6:
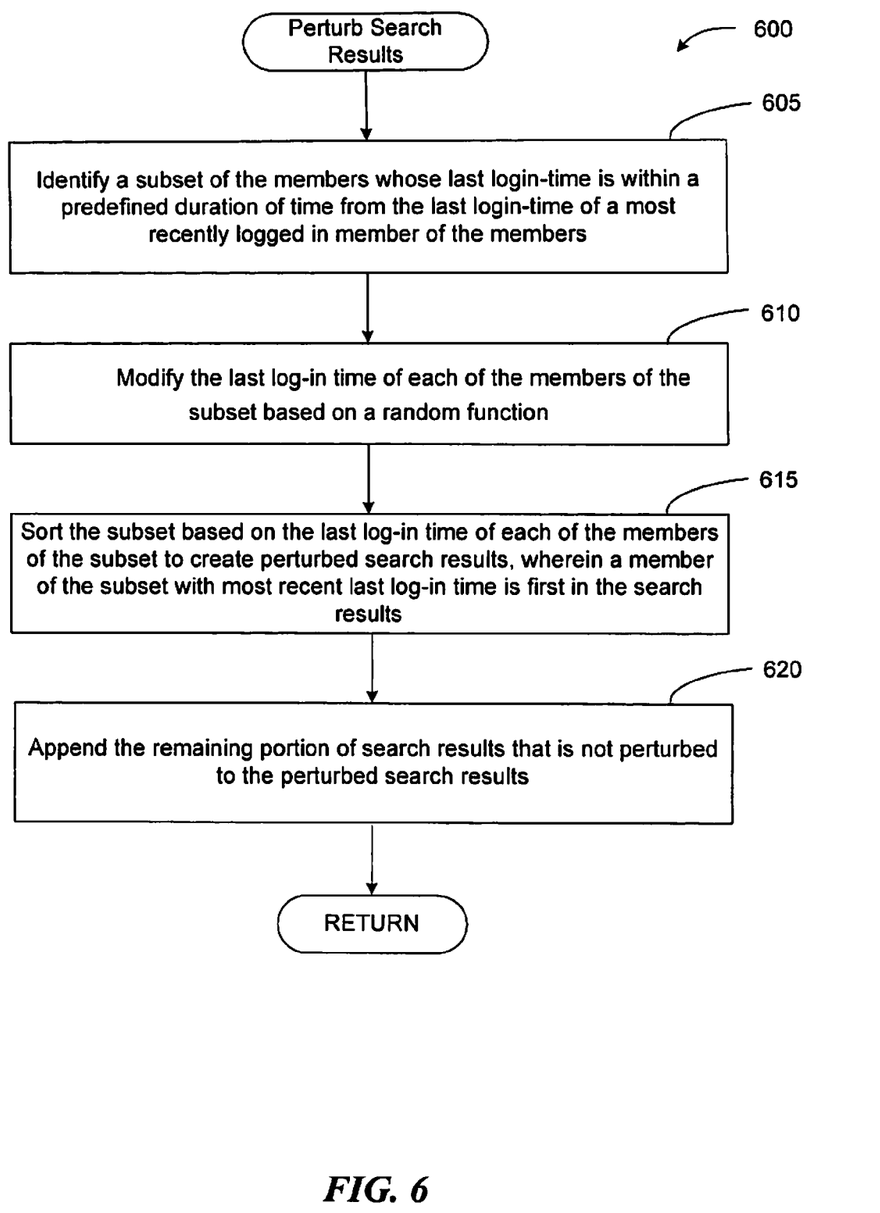
FIG. 6 illustrates another flow diagram of a process for perturbing search results.

FIG. 6 illustrates an example process 600 of perturbing the search results, in accordance with an embodiment of the disclosed technique. The process 600 may be executed in an environment such as social networking environment 100 of FIG. 1 and/or a search engine 205 of FIG. 2. At step 605, the perturbation determination unit 225 identifies a subset of members or users of the social networking environment 100 from the intermediate search results whose most recent activity time is within a predefined time period from the most recent activity time of a most recently logged in user. At step 610, the most recent activity time of the subset of the members are modified based on a random function.

At step 615, the subset of the users are sorted based on the modified most recent activity time to create the perturbed search results, wherein the most recently logged in user is at the top of the perturbed search result. At step 620, the remaining portion of the intermediate search results that are not perturbed are appended to the perturbed search results.

Although the embodiments are described with respect to a search conducted for users in a social networking environment, the perturbation techniques are not limited to a search for users or for a search in the social networking environment. The perturbation technique can be applied to any search in general. Further, although the embodiments are described with respect to perturbation based on time or perturbation of results that are apart by a predefined duration, other perturbation criteria can be applied. For example, perturbation can be done based on a score, a rank of a search result; for a predefined number of results in a search result set; for a subset of results that is identified based on some criteria, etc.

Figure 7:
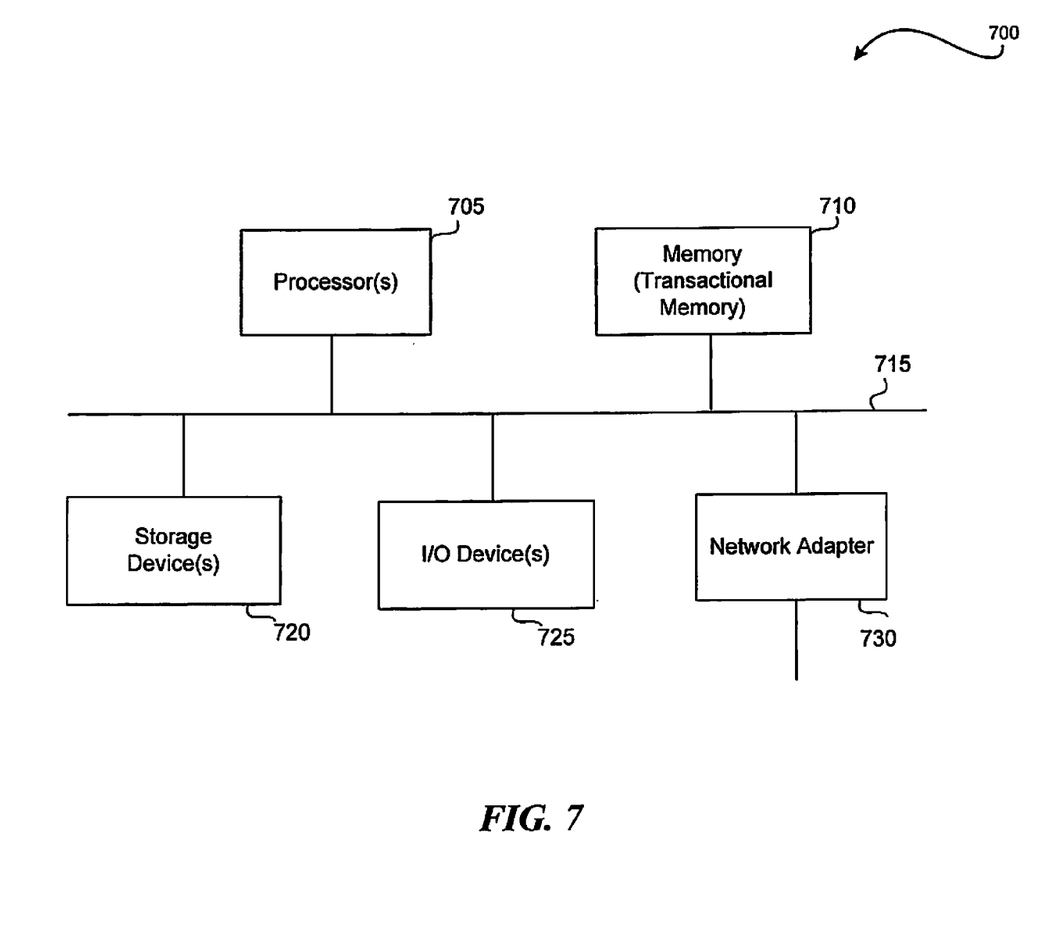
FIG. 7 is a block diagram of a processing system that can implement operations of the present invention.

FIG. 7 is a block diagram of an apparatus that may perform various operations, and store various information generated and/or used by such operations, according to an embodiment of the disclosed technique. The apparatus can represent any computer or processing system described herein. The processing system 700 is a hardware device on which any of the entities, components or services depicted in the examples of FIGS. 1-6 (and any other components described in this specification), such as client devices 115, host server 125, search engine 205, search perturbation unit 230, etc. can be implemented. The processing system 700 includes one or more processors 705 and memory 710 coupled to an interconnect 715. The interconnect 715 is shown in FIG. 7 as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 705 is/are the central processing unit (CPU) of the processing system 700 and, thus, control the overall operation of the processing system 700. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 710 is or includes the main memory of the processing system 700. The memory 710 represents any form of random access memory (RAM), read-only memory (ROM), flash memory, or the like, or a combination of such devices. Further, the memory 710 can also include a transactional memory that guarantees atomicity in executing transactions. In use, the memory 710 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 705 through the interconnect 715 are a network adapter 730, a storage device(s) 720 and I/O device(s) 725. The network adapter 730 provides the processing system 700 with the ability to communicate with remote devices, over a network and may be, for example, an Ethernet adapter or Fibre Channel adapter. The network adapter 730 may also provide the processing system 700 with the ability to communicate with other computers within the cluster. In some embodiments, the processing system 700 may use more than one network adapter to deal with the communications within and outside of the cluster separately.

The I/O device(s) 725 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 710 can be implemented as software and/or firmware to program the processor(s) 705 to carry out actions described above. In certain embodiments, such software or firmware may be initially provided to the processing system 700 by downloading it from a remote system through the processing system 700 (e.g., via network adapter 730).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 720 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
    receiving, at a server in a computer system and from a first user, a query to perform a search for user-interested information comprising a plurality of member profiles of a social networking system, the plurality of member profiles excluding member profiles that have a direct connection to the first user, the query including query parameters;
    obtaining, at the server and in response to the query, a plurality of search results based on the query parameters, the search results including the user-interested information;
    perturbing, at the server, at least a portion of the search results based on a perturbation criterion to generate a first set of perturbed search results; and serving, by the server, the first set of perturbed search results to the first user.

2. The method of claim 1, wherein obtaining the plurality of search results includes:
obtaining the plurality of member profiles based on the query parameters, the plurality of member profiles grouped into a plurality of goodness levels, wherein each goodness level is indicative of a degree of match between a particular member profile and the query parameters.

3. The method of claim 2,
wherein a group of member profiles corresponding to a particular goodness level is sorted by a most recent activity time of each member profile associated with the group of member profiles, wherein an active member profile with the most recent activity time is presented first in the search results.

4. The method of claim 3, wherein the perturbation criterion includes time.

5. The method of claim 4, wherein said perturbing the at least portion of the search results based on the most recent activity time of each of the member profiles.

6. The method of claim 4, wherein said perturbing includes:
identifying a subset of the plurality of member profiles where the most recent activity time is a predefined time period;
modifying the most recent activity time of each of the subset of member profiles based on a random function to generate a new activity time; and
sorting the subset of member profiles based on the new activity time.

7. The method of claim 6, wherein new activity time of each of the member profiles is within the predefined time period from the last login-time of a first member in the first set of perturbed search results.

8. The method of claim 6, wherein identifying the subset of the plurality of member profiles includes identifying member profiles associated with members from a group with a predefined goodness level.

9. The method of claim 6, wherein identifying the subset of the member profiles includes setting the predefined time period to a time period that includes member profiles from the search results having a relevancy to the search query above a predefined relevancy threshold.

10. The method of claim 6 further comprising:
append, at the server, remaining portion of the search results that is not perturbed to the first set of perturbed search results.

11. The method of claim 1 further comprising:
storing the search results and the first set of perturbed search results in a cache of the computer system.

12. The method of claim 1 further comprising:
receiving, at the server, the query from a second user;
perturbing, at the server, the at least portion of the search results based on a perturbation criterion to generate a second set of perturbed search results, wherein the second set of perturbed search results is different from the first set of perturbed search results; and
serving, by the server, the second set of perturbed search results to the second user.

13. The method of claim 1, wherein, for a given query with given query parameters and a given search results, the first set of perturbed search results is distinct for at least one of (a) each of a plurality of users executing the given query or (b) each instance of executing the query by a given user of the users.

14. A method comprising:
receiving, at a server in a computer system, a query to perform a search for user-interested information, the query including query parameters;
obtaining, at the server and in response to the query, a plurality of search results from a database based on the query parameters, the plurality of search results including the user-interested information;
determining, at the server, whether the query is received within a predefined duration from a time the query was executed previously;
responsive to a determination that the query is received within the predefined duration from the time the query was executed previously,
perturbing, at the server, at least a portion of the plurality of search results based on a perturbation criterion to generate perturbed search results; and
serving, by the server, the perturbed search results.

15. The method of claim 14, wherein the predefined duration corresponds to a frequency at which the database is updated with new user-interested information.

16. The method of claim 14, wherein receiving a query to perform a search for user-interested information includes receiving the query to perform the search for a plurality of members of a social networking system.

17. The method of claim 14, wherein perturbing the at least portion of the search results based on time includes perturbing the at least portion of the search results based on a most recent activity time of each of the members.

18. A system comprising:
a processor;
a receiver unit working in cooperation with the processor to receive a query to perform a search for user-interested information, the query including query parameters;
a search unit working in cooperation with the processor to obtain, in response to the query and from a database, a plurality of search results based on the query parameters, the plurality of search results including the user-interested information;
a perturbation determination unit working in cooperation with the processor to determine whether the query is received within a predefined duration from a time the query was executed previously;
a search result perturbation unit working in cooperation with the processor to perturb, responsive to a determination that the query is received within a predefined duration from the time the query was executed previously, at least a portion of the plurality of search results based on a perturbation criterion to generate perturbed search results; and
a search result transmission unit working in cooperation with the processor to serve the perturbed search results to a client device.

19. The system of claim 18 further comprising:
a cache to store the search results and the perturbed search results.

20. A method comprising:
receiving, at a server in a computer system and from a first user and a second user, a query to perform a search for user-interested information comprising a plurality of member profiles of a social networking system excluding member profiles which have a direct connection to the first user or second user, the query including query parameters;

obtaining, at the server and in response to the query, a plurality of search results based on the query parameters, the search results including the user-interested information;

perturbing, at the server, at least a portion of the search results based on a perturbation criterion to generate a first set of perturbed search results for the first user and a second set of perturbed search results for the second user, the first set of perturbed search results being different from the second set of perturbed search results; and serving, by the server, the first set of perturbed search results to the first user and the second set of perturbed search results to the second user.

21. The method of claim 20, wherein perturbing the search results include perturbing the search results for the first user based on a first perturbation criterion and perturbing the search results for the second user based on a second perturbation criterion.

* * * * *